United States Patent [19]

Olsen et al.

[11] 4,213,032
[45] Jul. 15, 1980

[54] CONTROL SYSTEM FOR CHARGING AND DISCHARGING AN ELECTRIC STORAGE HEATER

[75] Inventors: Gunnar E. R. Olsen; Poul C. C. Iversen, both of Nordborg, Denmark

[73] Assignee: Danfoss A/S, Nordborg, Denmark

[21] Appl. No.: 885,196

[22] Filed: Mar. 10, 1978

Related U.S. Application Data

[63] Continuation of Ser. No. 717,249, Aug. 24, 1976, abandoned.

[30] Foreign Application Priority Data

Sep. 3, 1975 [DE] Fed. Rep. of Germany ....... 2539117

[51] Int. Cl.² .................... H05B 1/02; F24H 7/04; F24D 11/00
[52] U.S. Cl. .................... 219/364; 126/400; 165/18; 219/365; 219/378; 219/491; 219/493; 219/497
[58] Field of Search ............... 219/364, 365, 328, 341, 219/325, 326, 491–493, 530, 540, 497; 126/400; 165/18, 104, 105

[56] References Cited

U.S. PATENT DOCUMENTS 3,975,620 8/1976 Hallgreen et al. ............... 219/378 X
4,039,773 8/1977 Iversen ..................... 219/364

FOREIGN PATENT DOCUMENTS 1295160 5/1969 Fed. Rep. of Germany ........... 219/364
2044934 3/1972 Fed. Rep. of Germany ........... 219/364
2348741 4/1975 Fed. Rep. of Germany ........... 219/364
2450688 4/1976 Fed. Rep. of Germany ........... 219/364
1276014 6/1972 United Kingdom ................... 219/364

Primary Examiner—A. Bartis
Attorney, Agent, or Firm—Wayne B. Easton

[57] ABSTRACT

The invention relates to an electric storage heater assembly which includes a core and a resistance heater for the core. A low tariff period switch and a charging switch are in series with the resistance heater. A triggering unit, which includes an integrator in one embodiment, and an integrator and comparator in a second embodiment, operates the charging switch. A feed circuit for charging the integrator is responsive to the indoor temperature and the unregulated heat loss from the core. A scanning circuit which produces the opposite effect is responsive to the regulated heat loss from the core and the outdoor temperature. The scanning circuit can be connected to either the integrator in one embodiment or to the comparator in the other embodiment.

3 Claims, 2 Drawing Figures

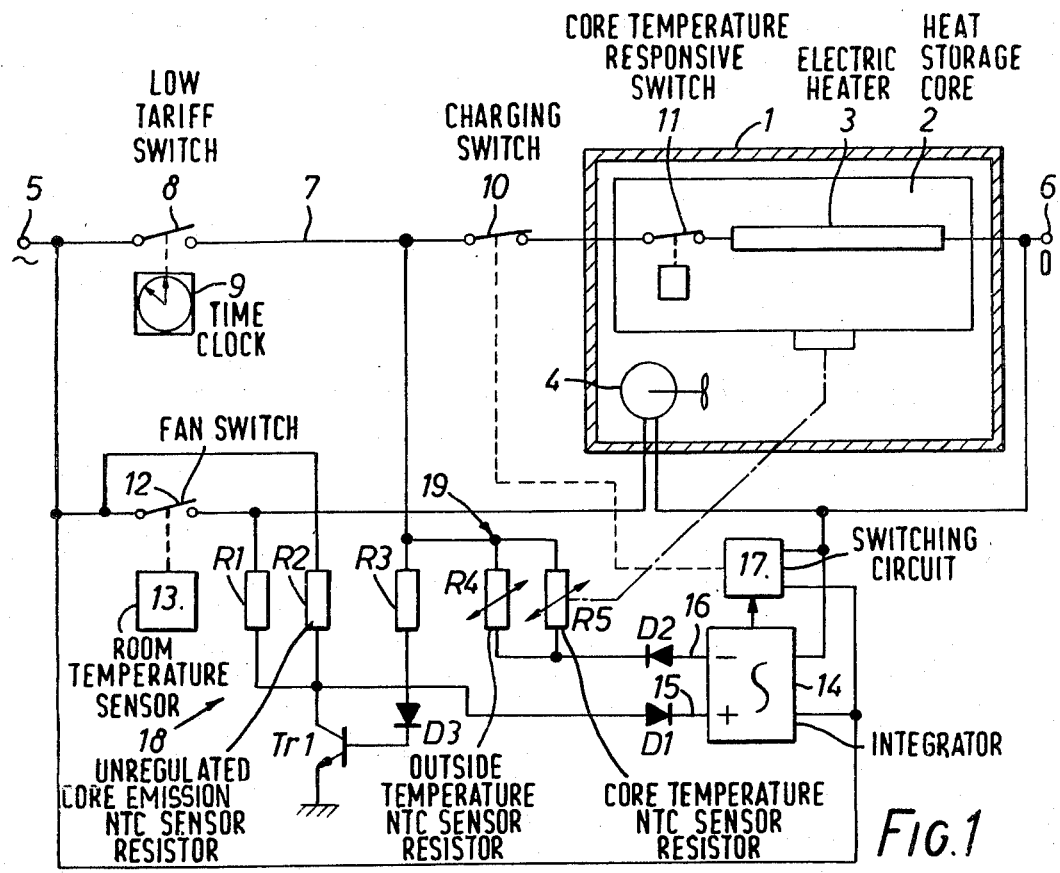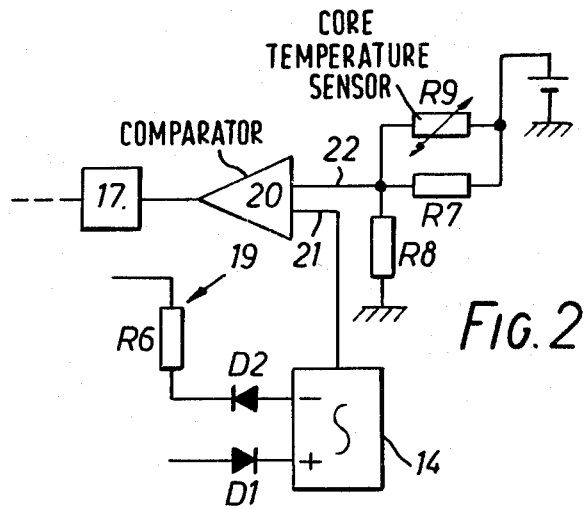

CONTROL SYSTEM FOR CHARGING AND DISCHARGING AN ELECTRIC STORAGE HEATER

This is a continuation of patent application Ser. No. 717,249, filed Aug. 24, 1976, now abandoned.

The invention relates to a method of charging and discharging an electric storage heater, in which, during a first operative condition, a characteristic quantity decisive for the storage discharge is supplied to form an integration value and, during a second operative condition, a scanning quantity is supplied to resolve the integration value, and the scanning period up to reaching a predetermined terminal scanning value of the integration value is used as a measure for charging. The invention also relates to an apparatus for performing this method.

It is known to charge a current integrator, e.g. a coulometer or an accumulator, during the discharge period by means of a current that is governed by the heat demand of the room to be heated. On commencement of the low tariff period, the integrator is scanned by means of a constant current flowing in the reverse direction. As soon as the integrator has been fully discharged which is noticeable by a sudden rise in the resistance in the case of a coulometer or accumulator, a switching signal is emitted which initiates heating of the storage core, heating then being continued until the end of the low tariff period.

In this apparatus, only these data can be used for the charging that were taken into consideration by the integrator on commencement of the low tariff period. Since the characteristic quantity supplied to the integrator only takes into account data that were decisive for the storage discharge, the storage heater can be replenished to replace the withdrawn heat by means of charging, but possibly to an excessively high level of the core temperature if the room was occasionally overheated during the discharge period as a result of sun rays, occupation by many people and the like.

To allow for such overheating, it has already been suggested to use a room thermostat with three positions, namely a low temperature setting at which the fan associated with the storage heater is switched on and the running periods for the fan are summated in the integrator, a normal temperature setting at which the fan is switched off and no characteristic quantity is fed to the integrator, and an excessive temperature setting for which the running period of the fan is subtracted in the integrator from the sum of the running periods of the fan.

The invention is based on the object of providing a method of the aforementioned kind permitting a more accurate adaptation in a simple manner of the charging of the electric storage heater to the expected discharge conditions.

This object is achieved according to the invention in that the scanning quantity and/or the terminal scanning value is a function of at least one variable control quantity.

In this method, the charging period is not already determined on commencement of the low tariff period but is corrected by extremely pertinent data which still occur during the low tariff period up to the end of the scanning. This results in more accurate charging. A change in the scanning quantity as well as a change in the terminal scanning value results in a realistically corrected scanning period, since it permits the conditions during the entire scanning period to be taken into account. Both values can be influenced relatively easily by a variable control quantity.

It is particularly favourable if the scanning quantity and/or the terminal scanning value is a function of the core temperature of the storage heater. If, on commencement of the low tariff period, the storage core has an excessively high core temperature, for example because foreign heat sources at least temporarily overheated the room to be heated, the scanning period is corrected so that during the new charge there will be less heating than that taking place as a result of normal characteristic discharge quantities.

Another possibility is that the scanning quantity and/or the terminal scanning value is a function of the outside temperature. If, during the low tariff period, there is a lower outside temperature and a higher heat consumption is therefore to be expected during the next discharge period, e.g. by reason of cooling of the walls, the charging period is increased by a corresponding correction of the scanning period.

It is also possible to consider the core temperature and the outside temperature simultaneously. The control quantity can also be changed by a programme, for example a weekend programme, at which the desired temperatures are reduced on Saturday and increased again on Monday but at the same time the charging periods during the respective preceding low tariff periods are correspondingly shortened or prolonged.

An apparatus for performing the method and comprising a current integrator, a feed circuit through which to supply a characteristic quantity current to the current integrator and a scanning circuit through which to supply it with a scanning current, as well as switching means responsive on reaching the terminal scanning value to influence the charge is characterised in that the scanning circuit comprises at least one control element with the aid of which the scanning current is variable. Such a charging and discharging apparatus is particularly simple to achieve by electrical means. The change in the scanning current is very easy to bring about with the aid of a control element. In the simplest case, the control element is a temperature-responsive resistance subjected to a temperature that forms the control quantity. In particular, the scanning circuit may comprise a first temperature-responsive control resistance subjected to the storage core temperature and a second temperature-responsive control resistance subjected to the outside temperature. Temperature fluctuations will thereby lead directly to changes in the scanning current.

When using a room temperature-controlled two-position thermostatic switch as part of the feed circuit, it is of particular advantage for the control element to be dependent on the storage core temperature. By means of the simple thermostatic switch, simple summation of the on periods form the integration value for the discharge that is dependent on the consumption. By taking the storage core temperature into account during the scanning, excess temperatures can be avoided in a simple manner.

In a preferred embodiment, provision is made that, when energised by alternating current, the feed circuit is connected to the current integrator by way of a diode and the scanning circuit is connected to the current integrator by way of an oppositely poled diode, and a switch-over device that is dependent on the operative condition selectively operates the feed circuit or scanning circuit. In this case the feed circuit can be connected to the mains supply in front of and the scanning circuit behind low tariff switches and the switch-over device may consist of the low tariff switch and a transistor which momentarily closes the output of the feed circuit and the base of which is, by way of a diode, likewise connected to the mains supply behind the low tariff switch. This results in very simple switching which is particularly suitable for the robust operation to which electric storage heaters are often subjected.

Another apparatus for performing the method and comprising an integrator, a feed circuit through which to supply a characteristic quantity to the integrator and a scanning circuit through which to supply it with a scanning quantity, as well as switching means responsive on reaching the terminal scanning value to influence the charge is characterised in that the switching means are associated with at least one control element with the aid of which the terminal scanning value is variable.

In a preferred embodiment, the switching means comprise a comparator which compares the integration value of the integrator with a predetermined threshold value and, on the existence of a predetermined difference, emits a switching signal, and that a correcting circuit containing the control element is provided to determine the difference.

Whereas the difference zero hitherto determined the terminal scanning value, the latter is changed with the aid of a variable difference. Here, too, simple temperature-responsive resistances are suitable as control elements.

The invention will now be described in more detail with reference to the example shown in the drawing.

In the drawing:

FIG. 1 is a diagrammatic representation of a first apparatus for performing the method according to the invention, and FIG. 2 shows a portion of a modified apparatus.

A storage heater 1 comprises a storage core 2 which can be heated by a heating resistance 3 and from which heat can be withdrawn by means of a fan 4. The arrangement is energised by alternating current supply mains of which the phase conductor is connected to a terminal 5 and the zero conductor to a terminal 6. In the mains supply 7 between the terminal 5 and the heating resistance 3 there are a low tariff switch 8 which is closed by a clock 9 only during the low tariff periods, a charging switch 10, and a switch 11 which is disposed in the storage core 2 and opens on excess temperature. The fan 4 is switched by means of a thermostatic switch 12 of which the senser 13 is subjected to the temperature of the room to be heated.

A current integrator 14 has a charging input 15 with associated diode D1 and a discharge input 16 with associated oppositely poled diode D2. This current integrator 14 may be a condenser or a secondary element, preferably an electrolytic element, in which a solid electrolyte with high ion conductivity, e.g. a silver halogenide compound, is disposed between an electrode of active material, e.g. silver, and an electrode of relatively inactive material, e.g. gold. Switching circuit means 17 responds as soon as the integrator 14 is fully discharged and then opens the charging switch 10.

The charging input 15 of the integrator 14 is energised by way of a feed circuit 18 which, apart from the thermostatic switch 12, comprises a resistance R1 in series with this switch and a resistance R2 parallel to the series circuit. An integrating current proportional to the running period of the fan 4, i.e. the required heat consumption of the room, flows through the resistance R1. Permanently flowing through the resistance R2 there is an integrating current which allows for the unregulated emission of heat from the storage core 2 by convection and radiation. The output of the feed circuit 18 can be short-circuited by a transistor Tr1 when the low tariff switch 8 closes. For this purpose, the base of the transistor is connected to the mains supply 7 behind the switch 8 by way of a resistance R3 and a diode D3.

The discharge input 16 is connected to a scanning circuit 19. This consists of two parallel resistances R4 and R5 disposed between the diode D2 and the mains supply 7 behind the low tariff switch 8. The scanning circuit 19 therefore becomes effective as soon as the low tariff switch 8 has been closed. Both resistances R4 and R5 are temperature-responsive resistances, namely NTC resistances. R4 is subjected to the outside temperature. R5 is subjected to the temperature of the storage core, as is indicated in chain-dotted lines; it is therefore either connected to the storage core or disposed in the air passage. The higher the outside temperature and the higher the storage core temperature, the larger will be the scanning current and the shorter will be the scanning period which is in this case identical with the charging period.

Since the uncontrolled heat emission from the storage heater is dependent on the core temperature, the resistance R2 may also be in the form of an NTC resistance so that the integrating current likewise falls with a drop in core temperature. Further, the resistances R4 and R5 could also be connected in series if their characteristic is correspondingly adapted.

The apparatus functions in the following manner. During the high tariff period, the charged storage core 2 gives off heat continuously by radiation and convection as well as forcibly by means of the fan 4 when so required by the thermostatic switch 12. Both manners of discharge are recognised by characteristic current quantities in the feed circuit 18. These characteristic current quantities are integrated in the integrator 14. As soon as the low tariff switch 8 closes, the feed circuit 18 is made ineffective and the scanning circuit 19 comes into operation. The scanning current is not constant but is corrected by the outside temperature and the core temperature. Consequently one obtains a scanning period determined not only by the integration value of the integrator 14 on commencement of the low tariff period but also on the outside temperature and the core temperature during the low tariff period. As soon as the integrator 14 has been completely discharged, the switching device 17 responds and opens the charging switch 10. The storage heater has thereby reached a charged condition that is realistically adapted to the anticipated consumption with an optimum core temperature.

In the FIG. 2 embodiment, the same components are used as in FIG. 1. The only difference is that instead of the variable resistances R4 and R5 there is provided a fixed but possibly adjustable resistance R6 in the scanning circuit. The scanning current is therefore constant. Further, a comparator 20 is provided of which the input 21 measures the charged condition of the integrator 14 in the form of a voltage or a current and to the input 22 of which a fixed threshold value is applied from the resistances R7 and R9 by means of a voltage divider to which a constant D.C. voltage is applied. The resistance R7 is in parallel with a temperature-responsive resistance R9 which is subjected to the core temperature. R9 therefore forms a correcting circuit with the aid of which a difference is created between the original threshold value and the actual response value, the difference being dependent on temperature. If the integrator 14 is not fully discharged during this evaluation, an additional apparatus may be provided which completely discharges it prior to commencement of the next high tariff period. Instead of the resistance R9 or in addition thereto, a resistance may be provided that is responsive to the outside temperature.

Numerous other modifications are possible. For example, the integration need not be performed electrically; mechanical integration is also possible. The scanning circuit may also be provided with selectively operable resistances which, for example, control a weekend programme. If the resistances R2 and R5 are NTC resistances, it may in some cases be sufficient to have a single resistance element which is alternately applied to the feed circuit and the scanning circuit by means of a switch. By reversing the cycle conditions, integration can also take place so that the periods are integrated during which the fan 4 is inoperative; in that case the charging switch 10 is closed only when the scanning period has been completed and charging of the storage core is then carried out up to the end of the low tariff period.

We claim:

1. An electric storage heater assembly comprising, a heat storage core, a low tariff period switch and a charging switch in series with said resistance heater, means including an integrator for operating said charging switch, a time clock for operating said low tariff switch, feed circuit means only effective when said tariff switch is open and being responsive to at least one environmental temperature indicative of discharge of heat from said core for charging said integrator, scanning circuit means, controlled by operation of said low tariff switch, for discharging said integrator, switching circuit means responsive to the discharge of said integrator for actuating said charging switch to terminate the charging period, said scanning circuit means including means responsive to at least one other environmental temperature whereby said switching circuit means actuates said charging switch to terminate the charging period at the end of a time period determined by the charge on said integrator and said other environmental temperature, said environmental temperature responsive means of said scanning circuit means including temperature responsive NTC resistor means to vary the length of said time period inversely relative to said other environmental temperature.

2. An electric storage heater assembly according to claim 1 wherein said NTC resistor means modulates the discharge rate of said integrator.

3. An electric storage heater assembly according to claim 1 wherein said scanning circuit includes a comparator having its output connected to said switching circuit means, said comparator having one input connected to said integrator and the other input connected to said NTC resistor means.

* * * * *